United States Patent
Henderson

(10) Patent No.: US 8,965,406 B2
(45) Date of Patent: Feb. 24, 2015

(54) GENERATING GEOFENCES

(75) Inventor: William Henderson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 66 days.

(21) Appl. No.: 13/605,464

(22) Filed: Sep. 6, 2012

(65) Prior Publication Data

US 2014/0066090 A1   Mar. 6, 2014

(51) Int. Cl.
*H04W 24/00*   (2009.01)
*H04M 3/42*   (2006.01)
*G06Q 30/00*   (2012.01)

(52) U.S. Cl.
USPC .............. 455/456.3; 455/456.1; 455/414.2; 705/14.57; 705/14.58

(58) Field of Classification Search
USPC ............ 455/456.1–457, 404.2, 414.1–414.2; 340/539.13; 705/14.39
See application file for complete search history.

(56) References Cited

U.S. PATENT DOCUMENTS

| | | |
|---|---|---|
| 2008/0162034 A1 | 7/2008 | Breen |
| 2009/0164118 A1* | 6/2009 | Breen ............... 701/207 |
| 2009/0286549 A1 | 11/2009 | Canon et al. |
| 2011/0148626 A1* | 6/2011 | Acevedo ............. 340/539.13 |
| 2011/0178811 A1 | 7/2011 | Sheridan |
| 2011/0250875 A1 | 10/2011 | Huang et al. |
| 2011/0250901 A1 | 10/2011 | Grainger et al. |
| 2012/0005026 A1* | 1/2012 | Khan et al. ............. 705/14.64 |
| 2012/0008526 A1* | 1/2012 | Borghei ................ 370/254 |
| 2012/0172027 A1* | 7/2012 | Partheesh et al. ........... 455/420 |
| 2012/0214506 A1 | 8/2012 | Skaaksrud et al. |
| 2014/0057648 A1* | 2/2014 | Lyman et al. ........... 455/456.1 |

FOREIGN PATENT DOCUMENTS

WO   2012/000107   1/2010

OTHER PUBLICATIONS

International Search Report and Written Opinion in International Patent Application No. PCT/US2013/058251, filed Sep. 5, 2013, Recieved Dec. 11, 2013. 12 pages.

* cited by examiner

*Primary Examiner* — Michael Mapa
(74) *Attorney, Agent, or Firm* — Fish & Richardson P.C.

(57) ABSTRACT

A method of generating geofences includes a) storing a plurality of stored locations; b) obtaining a first current location of a mobile device; c) identifying a plurality of nearest locations to the first current location; d) identifying an outermost location and determining an outer bound location, the outer bound location being located farther from the first current location than any of the plurality of nearest locations other than the outermost location; e) generating, for each nearest location except the outermost location, a local geofence around the nearest location; f) generating a triggering geofence around the first current location, the triggering geofence perimeter including at least the plurality of nearest locations other than the outermost location but not including the outer bound location; g) upon detecting that the mobile device has exited the triggering geofence iterating steps b) to f) for a new current location of the mobile device.

12 Claims, 8 Drawing Sheets

GENERATING GEOFENCES

TECHNICAL FIELD

This disclosure relates to generating geofences.

BACKGROUND

A geofence is a virtual perimeter for a real world geographic area. Generally, a geofence can be measured by a radius around a location. A mobile computing device can generate a geofence around a location, for example, a merchant location. The mobile device can detect whether the mobile device enters or exits the geofence. The detection can occur as a background process on an operating system of the mobile device. Based on the detection, the mobile device can be provided with a notification.

SUMMARY

On the one hand, it would be generally convenient for a mobile device to generate and detect a large number of geofences around locations (e.g., points of interest). On the other hand, the mobile device may be limited by only being able to generate and detect a maximum number of concurrent geofences, e.g., due to constraints by the mobile device operating system, available battery power or processing load.

An approach for generating geofences is for the mobile device to generate a number of geofences around selected nearby locations, and an additional geofence having a "large" radius around the mobile device's current location. The mobile device repeats the step of generating geofences when the device detects exiting of the geofence having the "large" radius.

In one aspect, a method of generating geofences includes a) storing a plurality of stored locations; b) obtaining a first current location of a mobile device; c) identifying a plurality of nearest locations to the first current location out of the plurality of stored locations; d) identifying an outermost location of the plurality of nearest locations and determining an outer bound location based on the outermost location, the outer bound location being located farther from the first current location than any of the plurality of nearest locations other than the outermost location; e) generating, for each nearest location in the plurality of nearest locations except the outermost location, a local geofence around the nearest location; f) generating a triggering geofence around the first current location, the triggering geofence perimeter including at least the plurality of nearest locations other than the outermost location but not including the outer bound location; g) upon detecting that the mobile device has exited the triggering geofence iterating steps b) to f) for a new current location of the mobile device.

Implementations may include one or more of the following features. The nearest locations are merchant locations. Obtaining a second current location of the mobile device; determining the second current location is located inside one of the local geofences; and generating a notification on the mobile device. The nearest location associated with the local geofence is a merchant, where the notification is an indication that the mobile device is within the local geofence of the merchant, further comprising: sending the notification to a computer system of the merchant. A radius of the triggering geofence is the distance between the first current location and an outer bound circumference location, the outer bound circumference location being located a distance of a radius of the local geofence from the outermost location.

Advantages may include one or more of the following. A mobile device will be able to detect a large number of geofences. The mobile device is effectively not limited in the number of geofences that can be tracked.

Other aspects, features and advantages may be apparent from the detailed description and the drawings.

BRIEF DESCRIPTION OF THE DRAWINGS

Like reference numbers and designations in the various drawings indicate like elements.

DETAILED DESCRIPTION

Figure 1:
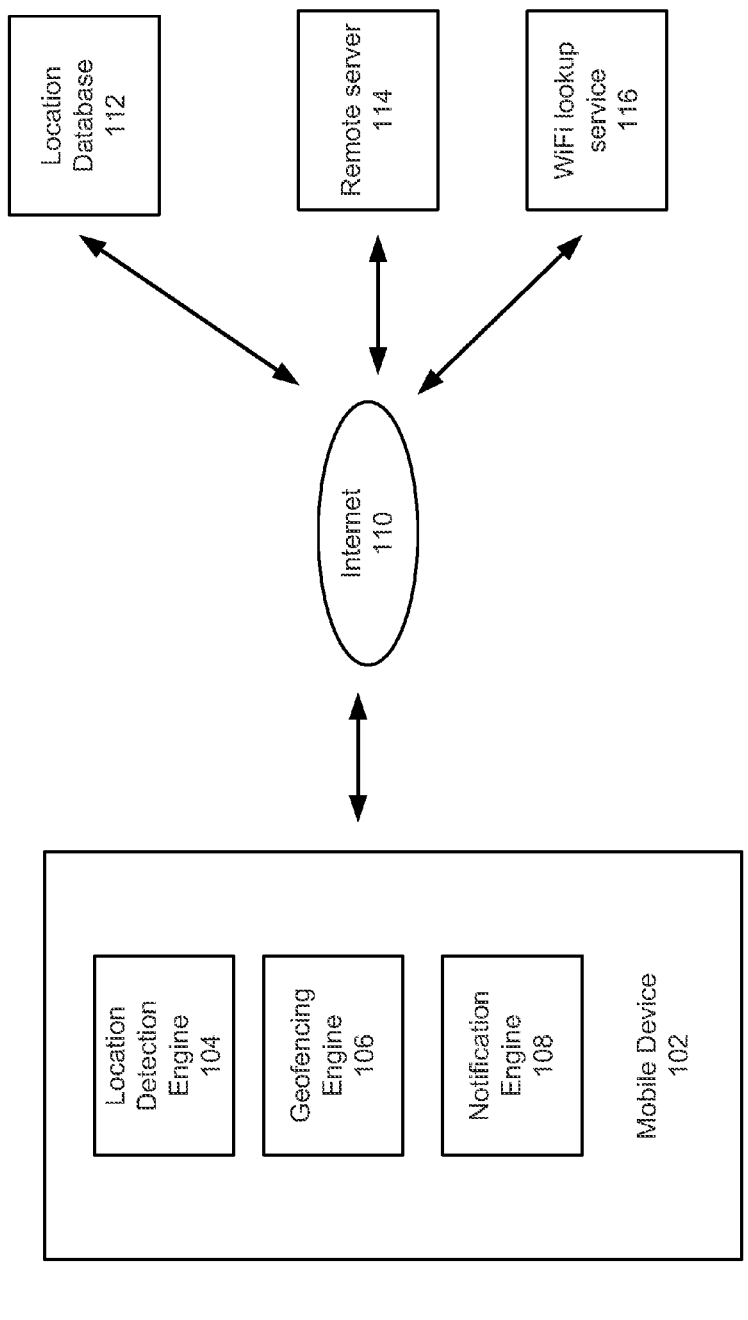
FIG. 1 is a schematic illustration of an example geofence generation system.

FIG. 1 is a schematic illustration of an example geofence generation system 100. The system 100 includes a mobile computing device 102, e.g., a smartphone, a portable media player, or tablet computer. The mobile device 102 includes a location detection engine 104, a geofencing engine 106, and a notification engine 108.

The mobile device 102 can detect its location using the location detection engine 104. The location detection engine 104 can detect the mobile device's current location using WiFi hotspots, cellular tower signals, and/or Global Positioning System (GPS) signals. The location detection engine 104 can run as a foreground or background process to provide the mobile device's location. In some implementations, the location detection engine 104 can be provided by the operating system of the mobile device 102. In some implementations, the location detection engine accesses a remote server 114 to make a call for location information, e.g., the remote server can receive a list of WiFi hotspots from the mobile device and can provide a location based on the list, or the remote server can request a location from a cellular service.

The mobile device 102 can generate geofences using the geofencing engine 106. In some implementations, the geofences enclose a circular area around a location. In some implementations, the geofences enclose a polygonal area around a location. The geofences can have perimeters that are established by an operating system or an application running on the mobile device 102. For example, a geofence can be established around a merchant location with a radius of 100 feet (ft).

In some implementations, as part of the generation process, the mobile device 102 can store WiFi hotspot identifications associated with a geofence. The mobile device 102 sends a request to a WiFi lookup service 116. The request can include a location around which a geofence should be generated and a radius. The location can be established by the location detection engine or received from a location database 112. The WiFi lookup service 116 can respond with a set of WiFi hotspot identifications based on the location and the radius. In some implementations, the WiFi lookup service 116 also responds with longitude and latitude coordinates of the WiFi identifications. The response is stored by the mobile device 102, and the stored WiFi hotspot identifications are associated with the geofence. Geofences can therefore be represented not only using latitude and longitude coordinates, but also using WiFi hotspot identifications.

The geofence engine 106 can detect whether the mobile device 102 is inside or outside of a generated geofence. In some implementations, the detection is based on the set of WiFi hotspot identifications. The mobile device 102 can identify surrounding WiFi hotspots (e.g., using a WiFi detector) for the mobile device's current location. The mobile device 102 can compare the current WiFi hotspot identifications to the stored WiFi hotspot identifications associated with the geofence. If the mobile device 102 determines that the current WiFi hotspot identifications are equivalent to the stored WiFi hotspot identifications, e.g., using a matching criterion, then the mobile device determines that the it is located outside the geofence, On the other hand, if the mobile device determines that the current WiFi hotspot are equivalent to the stored WiFi hotspot identifications, e.g., using a matching criterion, then the mobile device determines that it is located inside the geofence.

Alternatively, the detection is based on GPS or cellular tower triangulation. If locations of the geofence are represented by longitude and latitude coordinates, the geofence engine 106 can use GPS or cellular tower triangulation to obtain a longitude and latitude coordinate of the mobile device's current location. The geofence engine 106 can compare longitude and latitude coordinates to determine whether the mobile device is within the geofence.

Upon detection, the geofence engine 106 sends an indication to the notification engine 108. The notification engine 108 can provide a notification to an operating system or application running on the mobile device 102. For example, the notification can cause an application to execute an action (e.g., send a third-party request to an external server). In some implementations, the notification is sent to an application associated with a merchant. The application can process the notification and send the notification to a computer system of the merchant (e.g., to send information about the location of the mobile device).

The mobile device 102 can communicate with a location database 112 over a network (e.g., the Internet 110). The location database 112 provides locations that are associated with points of interest (e.g., merchant devices). For example, the location database 112 can receive a request including a mobile device's location. The location database 112 can then respond with one or more merchant locations near the mobile device's location. In some implementations, the locations are represented as longitudes and latitudes. The mobile device 102 can provide the merchant locations to the geofencing engine 106. The geofencing engine 106 can process the merchant locations and generate a geofence around the locations.

FIGS. 2-6 are example maps that illustrate a method of generating geofences.

Figure 2:
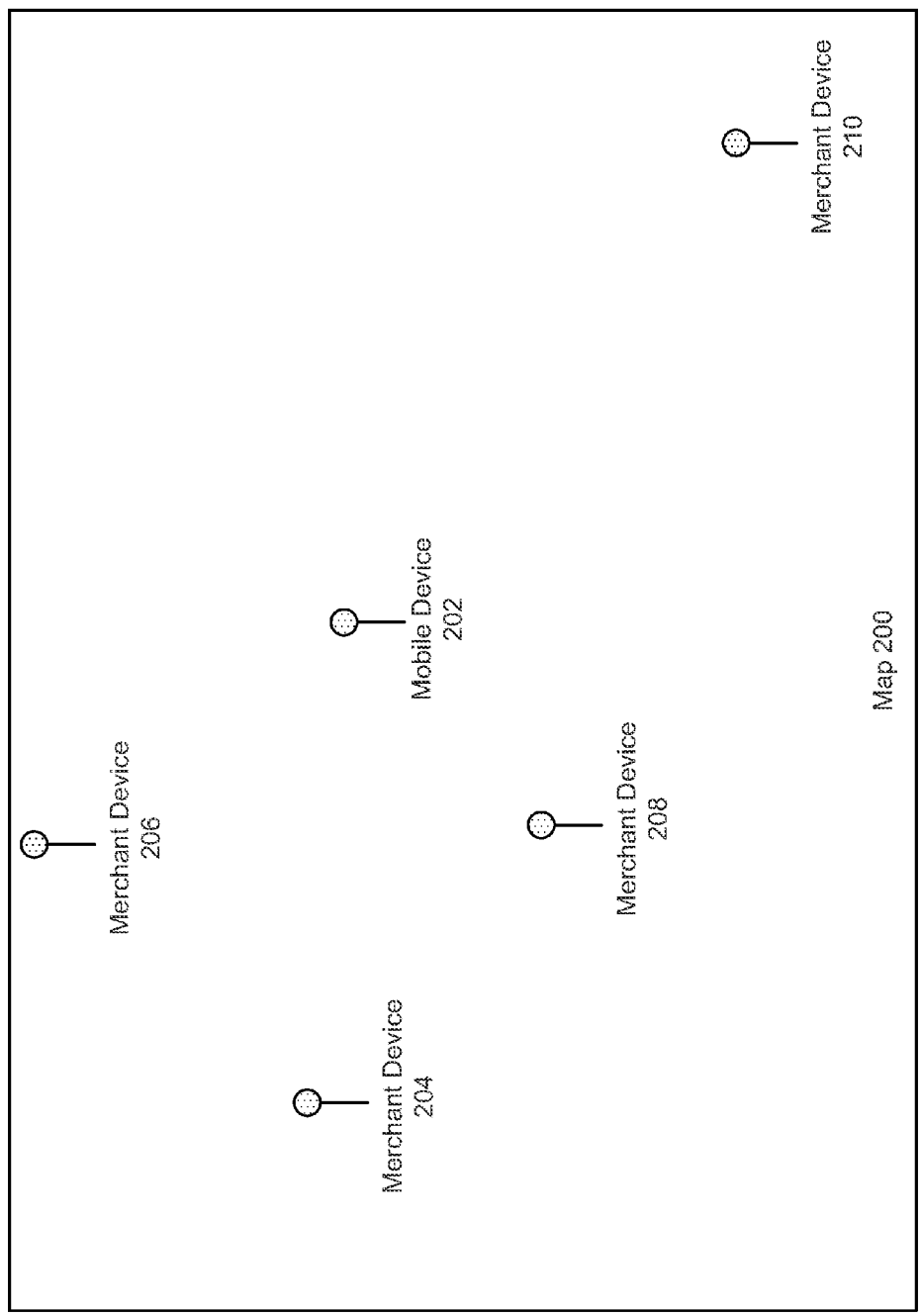
FIGS. 2-6 are example maps that illustrate a method of generating geofences.

FIG. 2 is an example map 200 that illustrates a mobile device 202 identifying locations 204, 206, 208, 210. The mobile device 202 receives nearby locations (e.g., by communicating with a location database as described above in reference to FIG. 1). In some implementations, the locations are locations of merchants. In some implementations, the mobile device 202 is limited to detecting a maximum number of concurrent geofences. For example, the maximum number can be 2, 4, 10, 20, 50, or more geofences. The mobile device 202 can identify the locations that are closest to the mobile device's current location, with a conventional Euclidean distance calculation. In some implementations, the mobile device identifies a number of nearby locations that is equivalent to the maximum number of concurrent geofences. That is, if N is the maximum number of concurrent geofences, then N closest locations are identified. For example, if the maximum number of concurrent geofences is 4 geofences, the mobile device 202 identifies the 4 closest merchant devices.

Figure 3:
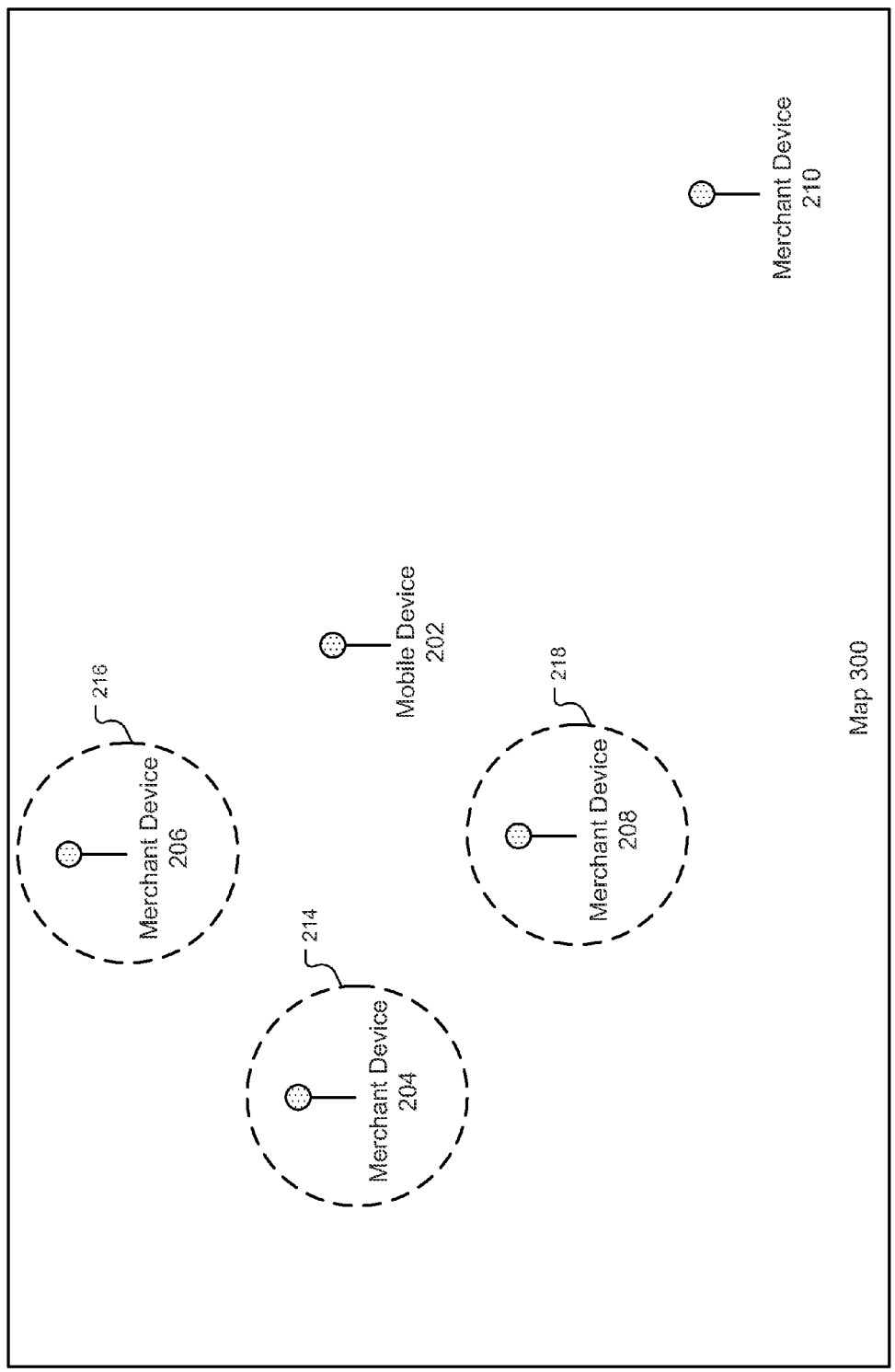

FIG. 3 is an example map 300 that illustrates the mobile device 202 generating "small" geofences, also referred to as local geofences, around the locations 204, 206, 208. The mobile device 202 generates the geofences around the locations nearest to the mobile device's location. In some implementations, the number of generated geofences is fewer than the maximum number of concurrent geofences. In some other implementations, if the mobile device 202 is limited to generating a maximum number of concurrent geofences, the mobile device 202 generates geofences numbering one less than the maximum number of concurrent geofences. That is, if N is the maximum number of concurrent geofences, then geofences are generated for the N−1 closest locations. For example, as illustrated in FIG. 3, if the limit is 4 geofences, the mobile device 202 generates 3 geofences 214, 216, 218 around the 3 nearest locations 204, 206, 208. The mobile device 202 does not generate a geofence around the fourth closest merchant device location (e.g., merchant device 210). The fourth closest location can be an outer bound location that is farther, from the mobile device's location, than the other merchant device locations that have small geofences. These geofences can have perimeters suitable for determination that the mobile device is present at or close to the location, e.g., that the mobile device is at a building or establishment corresponding to the location. For example, the N−1 geofences can have relatively small perimeters (e.g., a radius of 100, 150, or 500 feet). The mobile device 202 can use the remaining geofence for a large geofence as described below in reference to FIG. 4.

Figure 4:
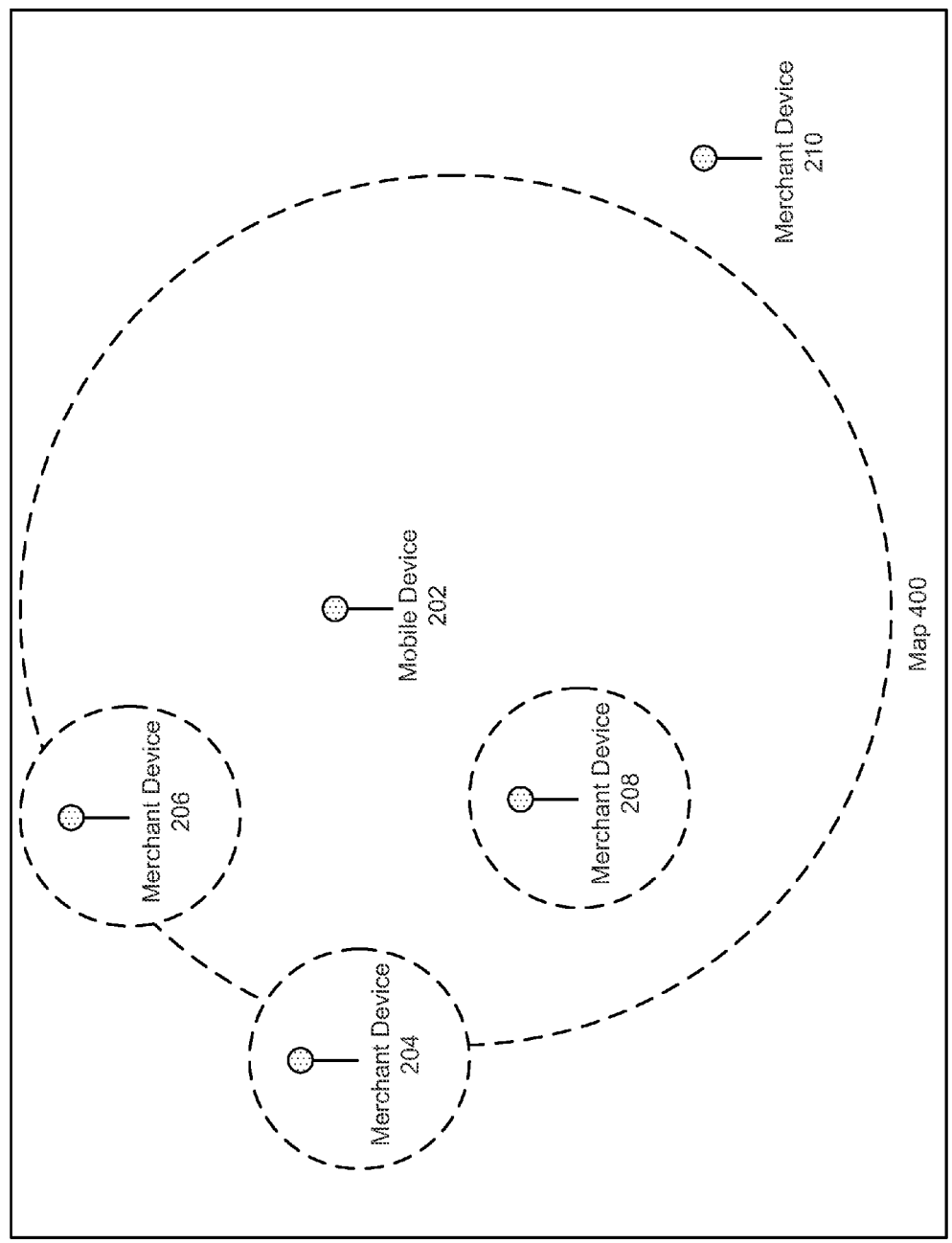

FIG. 4 is an example map 400 that illustrates a mobile device 202 generating a "large" geofence, also referred to as a triggering geofence, surrounding the mobile device 202. With a remaining geofence (e.g., the remaining geofence as described above in reference to FIG. 3), the mobile device 202 generates the geofence around the mobile device's current location and sets a relatively large radius for the geofence(as compared to the geofences use to detect presence near the locations 204, 206, 208). The large radius encloses up to, but does not include, the closest location that does not have a small geofence. That is, if N is the maximum number of concurrent geofences, then the perimeter of the "large" geofences is set to include the N−1 closest locations, but not include the Nth closest location. For example, as illustrated in FIG. 4, the mobile device 202 generated small geofences around locations 204, 206, and 208, but did not generate a geofence around location 210. The "large" geofence is established to include locations 204, 206, and 208 but does not include location 210. In some implementations, the radius of the large geofence is the distance between the mobile device's current location and a point on an outer bound circumference. The outer bound circumference can be a perimeter of the geofence that would be generated around the closest location that does not have a "small" geofence (e.g., location 210).

Figure 5:
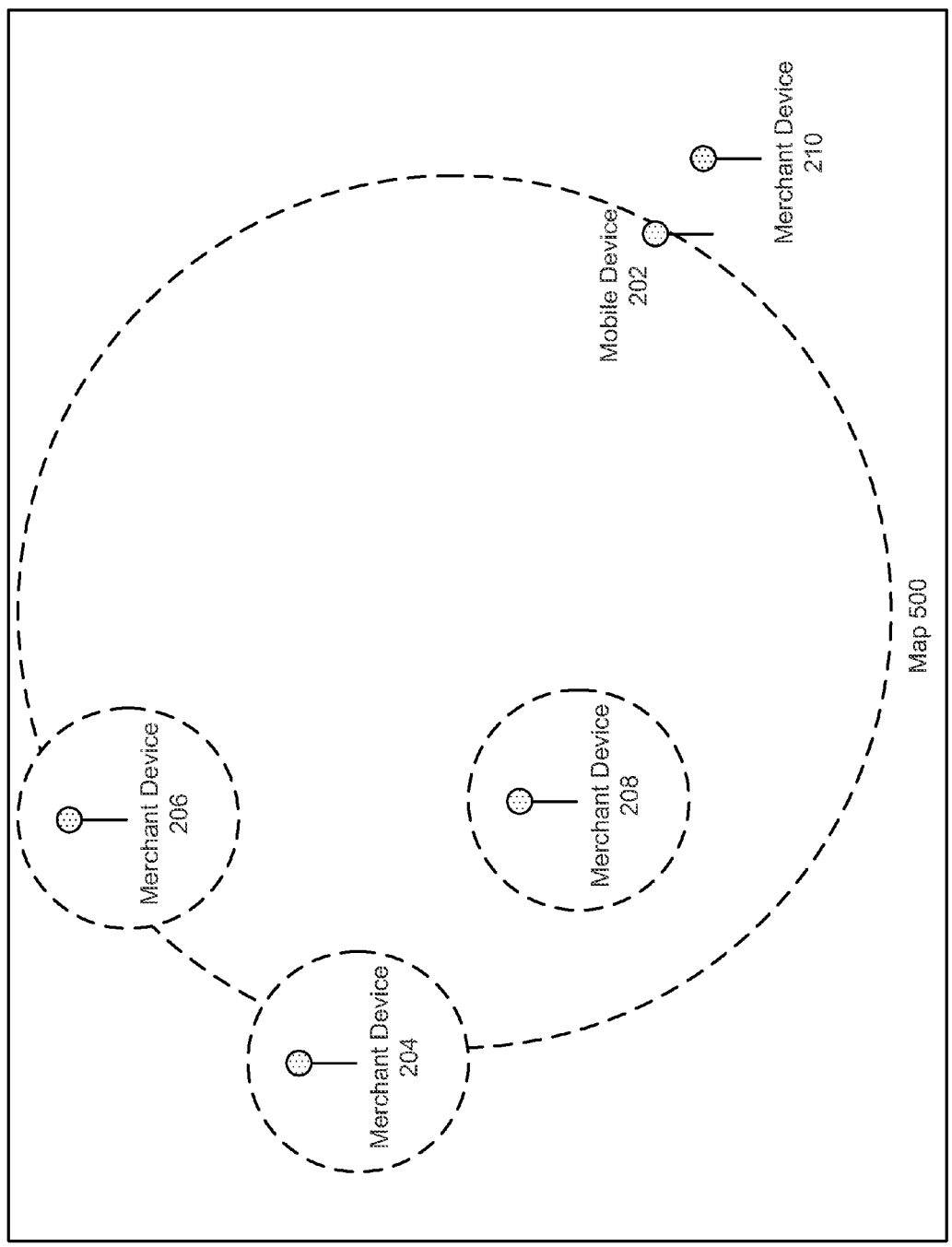

FIG. 5 is an example map 500 that illustrates a mobile device 202 exiting the large geofence. As described above in reference to FIG. 1, the mobile device 202 can detect when it exits a geofence. If the geofencing engine of the mobile device 202 detects that the mobile device 202 is located outside of the large geofence, the mobile device 202 repeats the process for generating geofences, as described above in reference to FIGS. 2-4.

Figure 6:
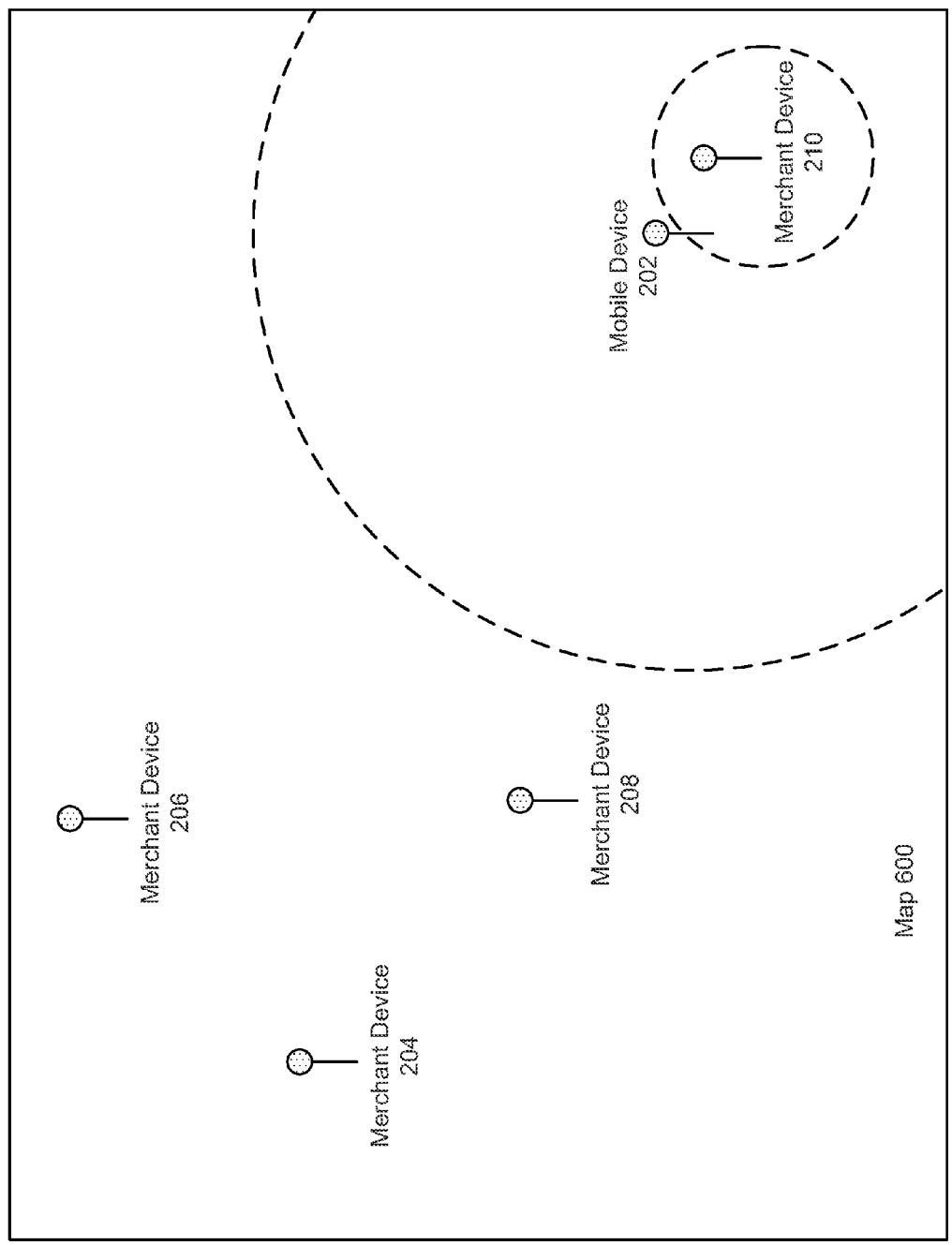

FIG. 6 is an example map 600 that illustrates a mobile device 202 repeating the process of generating geofences. The mobile device 202 performs, again, the processes described above in reference to FIGS. 2 and 4. For example, the mobile device 202 identifies merchants near the mobile device's location, generates small geofences around the merchants' locations (e.g., merchant device 210), and generates a large geofence around the mobile device's location. In some implementations, the mobile device 202 receives more nearby merchants from a location database. In alternative implementations, the mobile device 202 previously cached numerous nearby locations and identifies nearby merchants from the cache. In this way, the mobile device 202 can access an "infinite" number of geofences around merchant locations.

Although the description above focuses on geofences around locations of merchant devices, geofences can be generated around a location of any computer device, e.g., a user's smartphone or a laptop. In some implementations, geofences are generated around raw coordinates, e.g., coordinates received from a server.

Figure 7:
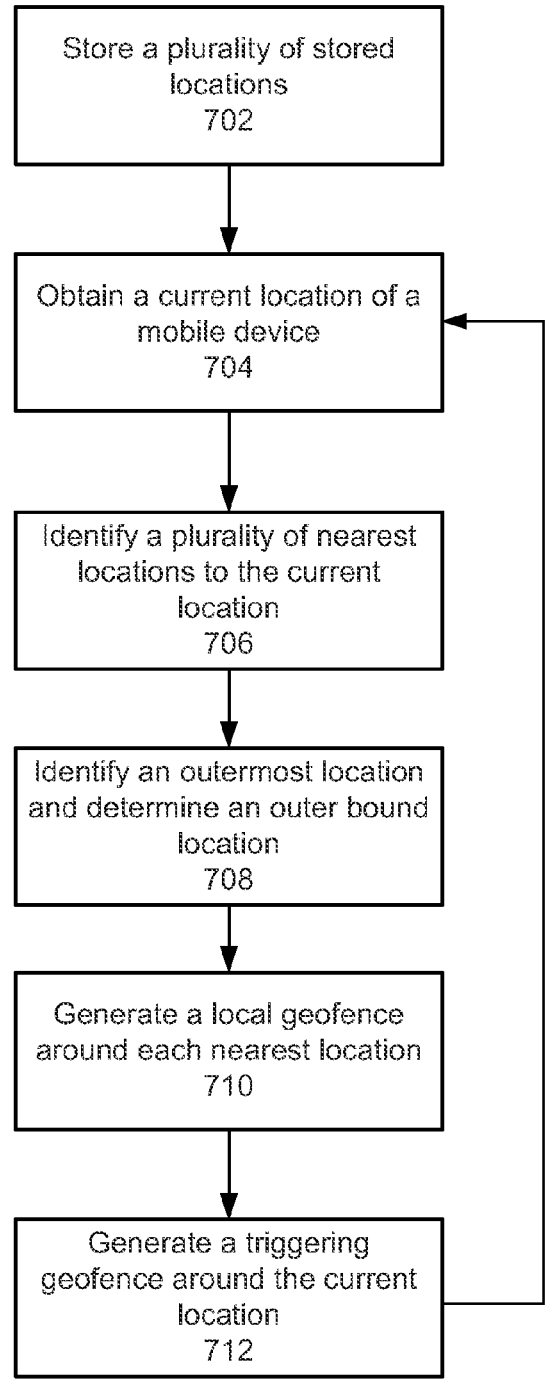
FIG. 7 is a flow chart of a method of generating geofences.

FIG. 7 is a flow chart of an example process 700 for generating geofences by a mobile device. The mobile device stores a set of locations as described above in reference to FIG. 1 (step 702). The mobile device obtains a current location of the mobile device (step 704). The mobile device identifies locations that are nearest to the current location as described above in reference to FIG. 2 (step 706). The locations can be obtained from the set of stored locations in the mobile device. The mobile device identifies an outermost location and determines an outer bound location (step 708). The outer bound location is located farther from the current location than any of the nearest locations other than the outermost location. The mobile device generates a local geofence around each nearest location (step 710) and generates a triggering geofence around the current location (step 712), which are described above in reference to FIGS. 3 and 4. Upon detecting that the mobile device has exited the triggering geofence, the mobile device then iterates steps 704-712 for a new current location around the mobile device, as described above in reference to FIGS. 5 and 6.

Figure 8:
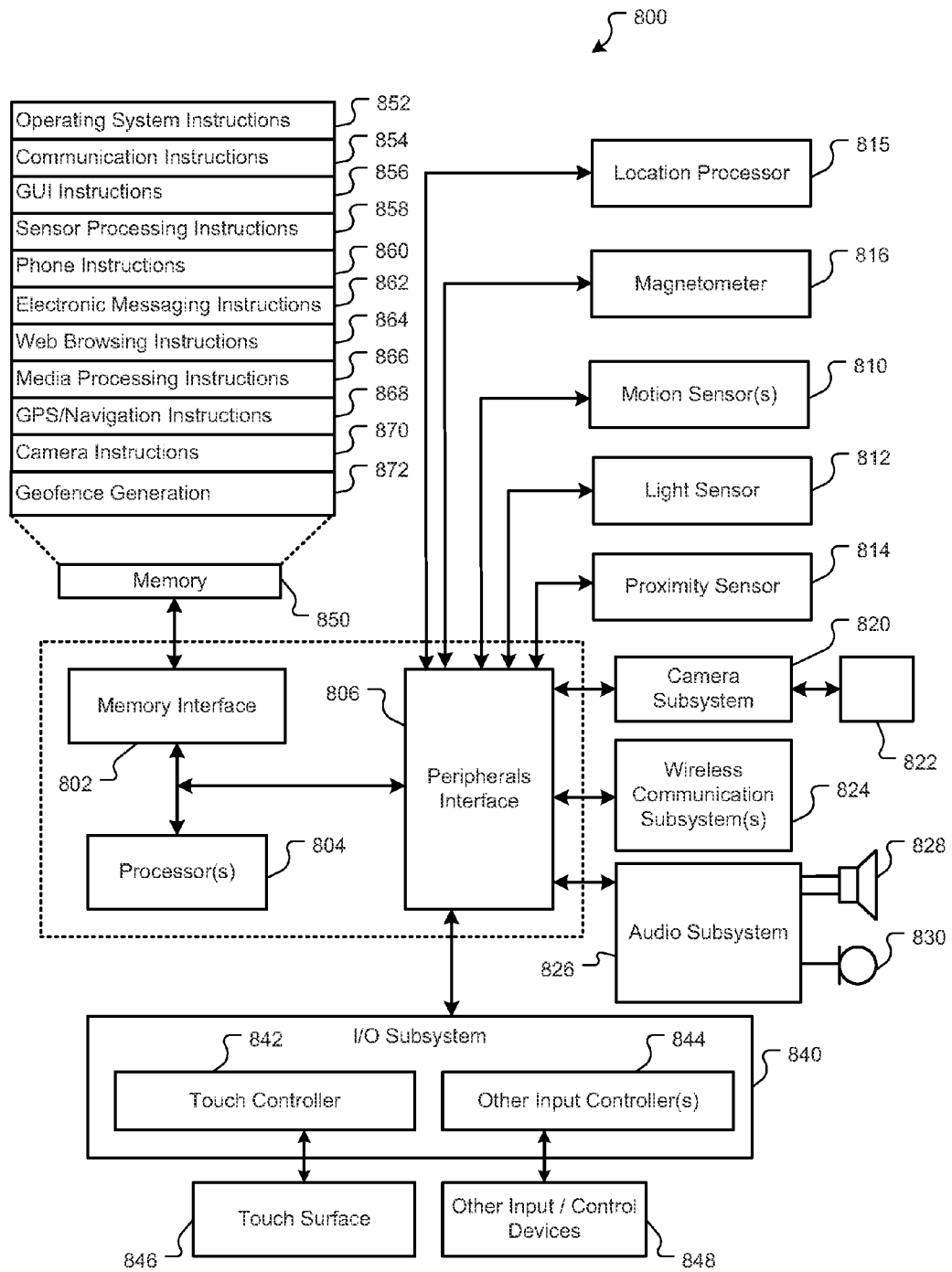
FIG. 8 is a block diagram of an exemplary architecture of a mobile device capable of generating geofences.

FIG. 8 illustrates a block diagram of an exemplary architecture of a mobile device capable of generating geofences. Architecture 800 can be implemented in any device for generating the features described in reference to FIGS. 1-7, including but not limited to portable or desktop computers, smart phones and electronic tablets, television systems, game consoles, kiosks and the like. Architecture 800 can include memory interface 802, data processor(s), image processor(s) or central processing unit(s) 804, and peripherals interface 806. Memory interface 802, processor(s) 804 or peripherals interface 806 can be separate components or can be integrated in one or more integrated circuits. The various components can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the device. For example, in some implementations, light sensor 812 can be utilized to facilitate adjusting the brightness of touch surface 846. In some implementations, motion sensor 810 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 806, such as a temperature sensor, a biometric sensor, or other sensing device, to facilitate related functionalities.

Location processor 815 (e.g., GPS receiver) can be connected to peripherals interface 806 to provide geo-positioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. Communication functions can be facilitated through one or more communication subsystems 824. Communication subsystem(s) 824 can include one or more wireless communication subsystems. Wireless communication subsystems 824 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 824 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 824 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 826 can be coupled to a speaker 828 and one or more microphones 830 to facilitate voice-enabled functions, such as voice recognition, voice replication, digital recording, and telephony functions.

I/O subsystem 840 can include touch controller 842 and/or other input controller(s) 844. Touch controller 842 can be coupled to a touch surface 846. Touch surface 846 and touch controller 842 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 846. In one implementation, touch surface 846 can display virtual or soft buttons and a virtual keyboard, which can be used as an input/output device by the user.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, device 800 can present recorded audio and/or video files, such as MP3, AAC, and MPEG files. In some implementations, device 800 can include the functionality of an MP3 player and may include a pin connector for tethering to other devices. Other input/output and control devices can be used.

Memory interface 802 can be coupled to memory 850. Memory 850 can include high-speed random access memory or non-volatile memory, such as one or more magnetic disk storage devices, one or more optical storage devices, or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers or servers. Communication instructions 854 can also be used to select an operational mode or communication medium for use by the device, based on a geographic location (obtained by the GPS/Navigation instructions 868) of the device. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions and display GUIs; media processing instructions 866 to facilitate media processing-related processes and functions; GPS/Navigation instructions 868 to facilitate GPS and navigation-related processes; camera instructions 870 to facilitate camera-related processes and functions; and instructions 872 for generating geofences. The memory 850 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of generating geofences, comprising:
obtaining, by a mobile device, a current location of the mobile device;
determining a plurality of nearest locations, the plurality of nearest locations being locations nearest to the current location of the mobile device out of a plurality of stored locations, wherein the mobile device can generate respective local geofences for the plurality of nearest locations;
determining a size for a triggering geofence based on a distance between the current location of the mobile device and a particular nearest location that is farthest from the current location of the mobile device of the plurality of determined nearest locations;
generating respective local geofences for the plurality of nearest locations except the particular nearest location that is farthest from the current location of the mobile device of the plurality of nearest locations;
generating a triggering geofence having the determined size, the triggering geofence enclosing the current location of the mobile device;
determining that the mobile device has exited the triggering geofence;
and in response to determining that the mobile device has exited the triggering geofence, updating the triggering geofence.

2. The method of claim 1, wherein updating the triggering geofence comprises:
determining a second different size for the triggering geofence, the second different size being based on an updated nearest location that is farthest from a second current location of the mobile device of a plurality of second nearest locations.

3. The method of claim 1, wherein determining a plurality of nearest locations comprises determining N nearest locations, and wherein determining the size for the triggering geofence comprises:
   determining a distance from the current location of the mobile device to an Nth nearest location, the Nth nearest location being farthest from the current location of the mobile device relative to any other of the plurality of nearest locations; and
   determining the size for the triggering geofence based on the distance from the current location of the mobile device to the Nth nearest location.

4. The method of claim 1, wherein the mobile device is configured to maintain a maximum of N concurrent geofences, and wherein determining the plurality of nearest locations comprises determining the N nearest locations.

5. A computer program product, encoded on one or more non-transitory computer storage media, comprising instructions that when executed by one or more computers cause the one or more computers to perform operations comprising:
   obtaining, by a mobile device, a current location of the mobile device;
   determining a plurality of nearest locations, the plurality of nearest locations being locations nearest to the current location of the mobile device out of a plurality of stored locations, wherein the mobile device can generate respective local geofences for the plurality of nearest locations;
   determining a size for a triggering geofence based on a distance between the current location of the mobile device and a particular nearest location that is farthest from the current location of the mobile device of the plurality of determined nearest locations;
   generating respective local geofences for the plurality of nearest locations except the particular nearest location that is farthest from the current location of the mobile device of the plurality of nearest locations;
   generating a triggering geofence having the determined size, the triggering geofence enclosing the current location of the mobile device;
   determining that the mobile device has exited the triggering geofence;
   and in response to determining that the mobile device has exited the triggering geofence, updating the triggering geofence.

6. The computer program product of claim 5, wherein updating the triggering geofence comprises:
   determining a second different size for the triggering geofence, the second different size being based on an updated nearest location that is farthest from a second current location of the mobile device of a plurality of second nearest locations.

7. The computer program product of claim 5, wherein determining a plurality of nearest locations comprises determining N nearest locations, and wherein determining the size for the triggering geofence comprises:
   determining a distance from the current location of the mobile device to an Nth nearest location, the Nth nearest location being farthest from the current location of the mobile device relative to any other of the plurality of nearest locations; and
   determining the size for the triggering geofence based on the distance from the current location of the mobile device to the Nth nearest location.

8. The computer program product of claim 5, wherein the mobile device is configured to maintain a maximum of N concurrent geofences, and wherein determining the plurality of nearest locations comprises determining the N nearest locations.

9. A system comprising one or more computers operable to perform operations comprising:
   obtaining, by a mobile device, a current location of the mobile device;
   determining a plurality of nearest locations, the plurality of nearest locations being locations nearest to the current location of the mobile device out of a plurality of stored locations, wherein the mobile device can generate respective local geofences for the plurality of nearest locations;
   determining a size for a triggering geofence based on a distance between the current location of the mobile device and a particular nearest location that is farthest from the current location of the mobile device of the plurality of determined nearest locations;
   generating respective local geofences for the plurality of nearest locations except the particular nearest location that is farthest from the current location of the mobile device of the plurality of nearest locations;
   generating a triggering geofence having the determined size, the triggering geofence enclosing the current location of the mobile device;
   determining that the mobile device has exited the triggering geofence;
   and in response to determining that the mobile device has exited the triggering geofence, updating the triggering geofence.

10. The system of claim 9, wherein updating the triggering geofence comprises:
    determining a second different size for the triggering geofence, the second different size being based on an updated nearest location that is farthest from a second current location of the mobile device of a plurality of second nearest locations.

11. The system of claim 9, wherein determining a plurality of nearest locations comprises determining N nearest locations, and wherein determining the size for the triggering geofence comprises:
    determining a distance from the current location of the mobile device to an Nth nearest location, the Nth nearest location being farthest from the current location of the mobile device relative to any other of the plurality of nearest locations; and
    determining the size for the triggering geofence based on the distance from the current location of the mobile device to the Nth nearest location.

12. The system of claim 9, wherein the mobile device is configured to maintain a maximum of N concurrent geofences, and wherein determining the plurality of nearest locations comprises determining the N maximum number of nearest locations.

* * * * *